United States Patent
Sun et al.

(10) Patent No.: US 7,643,239 B2
(45) Date of Patent: Jan. 5, 2010

(54) CONTROLLER SELECTION TO REDUCE WRITTEN-IN RUN-OUT

(75) Inventors: Yu Sun, Fremont, CA (US); Xiaoping Hu, Milipitas, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/789,680

(22) Filed: Apr. 25, 2007

(65) Prior Publication Data

US 2007/0297087 A1 Dec. 27, 2007

Related U.S. Application Data

(60) Provisional application No. 60/745,714, filed on Apr. 26, 2006.

(51) Int. Cl.
*G11B 21/02* (2006.01)
*G11B 5/596* (2006.01)

(52) U.S. Cl. ............... 360/75; 360/78.04; 360/77.02
(58) Field of Classification Search .................. None
See application file for complete search history.

(56) References Cited

U.S. PATENT DOCUMENTS

| | | | |
|---|---|---|---|
| 6,654,198 B2 * | 11/2003 | Liu et al. | 360/77.04 |
| 6,804,079 B2 | 10/2004 | Hsin | |
| 6,894,861 B1 | 5/2005 | Codilian et al. | |
| 7,035,041 B1 | 4/2006 | Guo et al. | |
| 7,116,513 B1 | 10/2006 | Sun et al. | |
| 7,145,745 B1 | 12/2006 | Shepherd et al. | |
| 7,330,332 B2 * | 2/2008 | Baek et al. | 360/77.04 |
| 7,345,842 B2 * | 3/2008 | Chang et al. | 360/77.04 |
| 2007/0035870 A1 | 2/2007 | Chang et al. | |
| 2007/0217052 A1 * | 9/2007 | Semba et al. | 360/75 |

* cited by examiner

*Primary Examiner*—Andrew L Sniezek
(74) *Attorney, Agent, or Firm*—David K. Lucente

(57) ABSTRACT

Embodiments of the present invention reduce the written-in run-out in servo data written to a storage medium. A set of servo controllers are evaluated and the controller having the best expected performance among the set is selected and employed. One embodiment of the present invention is a servo controller configured to select and employ a controller having a least amount of expected written-in run-out among a set of controllers. Another embodiment of the present invention is a method comprising a step for applying a set of controllers; and selecting a controller from the set of controllers with a least expected amount of written-in run out. Another embodiment of the present invention is a system comprising a servo controller for employing and selecting a disk controller that has a least expected amount of written-in run-out among a set of controllers.

26 Claims, 10 Drawing Sheets

CONTROLLER SELECTION TO REDUCE WRITTEN-IN RUN-OUT

CROSS-REFERENCE TO RELATED PATENT APPLICATIONS

This application claims priority from U.S. Provisional App. Ser. No. 60/745,714, filed Apr. 26, 2006, the contents of which are incorporated by reference herein in their entirety.

BACKGROUND

Embodiments of the present invention relate to reducing the written-in run-out in servo data written to a storage medium and, more particularly, to the selection of servo controllers for writing servo data.

Hard disk drives are used in almost all computer system operations, and recently even in consumer electronic devices such as digital cameras, video recorders, and audio (MP3) players. A hard disk drive typically includes a plurality of storage disks or hard disks vertically aligned about a central core that can spin at a wide range of standard rotational speeds depending on the computing application in which the hard disk drive is being used. Commonly, the central core is comprised, in part, of a spindle motor for providing rotation of the hard disks at a defined rotational speed. A plurality of magnetic read/write transducer heads, commonly one read/write transducer head per surface of a disk where a head reads data from and writes data to a surface of a disk, are mounted on actuator arms.

A storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the transducer while the transducer is positioned above (or below) the desired track. The write signal creates a variable magnetic field at a gap portion of the transducer that induces magnetically polarized transitions into the desired track. The magnetically polarized transitions are representative of the data being stored.

Reading is performed by sensing the magnetically polarized transitions on a track with the transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk. In a seek mode, the transducer is moved radially inwardly or outwardly to arrange the transducer above a desired track. In an on-track mode, the transducer reads data from or writes data to the desired track. The tracks are typically not completely circular. Accordingly, in the on-track mode the transducer must be moved radially inwardly and outwardly to ensure that the transducer is in a proper position relative to the desired track. The movement of the transducer in on-track mode is referred to as track following.

The above described movement of the transducer is controlled by a servo control system. The servo control system generally performs two distinct functions: seek control and track following. The seek control function includes controllably moving the transducer from an initial position to a target track position. In general, the seek function is initiated when a host computer associated with the computer disk drive issues a command to read data from or write data to a target track on the disk. Once the transducer has been moved sufficiently close to the target track by the seek function of the control system, the track following function of the servo control system is activated to center and maintain the transducer on the target track until the desired data transfers are completed.

The servo system includes a plurality of servo sectors on the disks to enable the head to access, or to seek, a particular track. The servo system also enables the head to remain on the track, or to track-follow. Servo performance can degrade if the servo tracks written to the disk are non-circular, a phenomenon known as written-in runout. Each track is divided into a number of data sectors and servo sectors. The data sectors are used to contain user data and the servo sectors contain the information for properly locating the read/write head.

Ideally, a head following the center of a track moves along a perfectly circular path around the disc. However, two types of errors prevent heads from following this ideal path. The first type of error is a written-in error that arises during the creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path.

The second type of error that prevents circular paths is known as track following error. Track following errors arise as a head attempts to follow the path defined by the servo fields. The track following errors can be caused by the same aerodynamic and vibrational effects that create written-in errors. In addition, track following errors can arise because the servo system is unable to respond fast enough to high-frequency changes in the path defined by the servo fields.

Written-in errors are often referred to as repeatable run-out errors because they cause the same errors each time the head passes along a track. As track densities increase, these repeatable run-out errors begin to limit the track pitch. Specifically, variations between the ideal track path and the actual track path created by the servo fields can result in a track interfering with or squeezing an adjacent track. This is especially acute when a first written-in error causes a head to be outside of an ideal circular path of an inner track and a second written-in error causes the head to be inside of an ideal circular path of an outer track. To avoid limitations on the track pitch, systems that compensate for repeatable run-out errors are employed.

One existing technique for repeatable run-out error compensation involves obtaining a sequence of repeatable run-out values, computing compensation values based on the repeatable run-out values, and storing the compensation values in compensation tables. These compensation values are then injected into the servo loop to compensate for repeatable run-out errors. In this technique, the sequence of repeatable run-out errors is obtained by repeatedly following tracks on the discs over a number of revolutions and averaging the position error signals obtained at each servo field over all of the revolutions. This averaging process is time consuming and complex.

Embodiments of the present invention provide solutions to these and other problems, and offer other advantages over the prior art. Additionally, the techniques presented here are suitable for use in a self-servo-writing process which is a post assembly process. Traditional pre-assembly techniques are costly and time consuming as they would normally require: i) to be done in a clean room environment, and ii) the use of laser interferometry to precisely position the transducer heads as the servo data is written.

SUMMARY

Embodiments of the present invention relate to reducing of the written-in run-out in servo data written to a storage medium. A set of servo controllers are evaluated and the controller having the best expected performance among the set is selected and employed.

One embodiment of the present invention is a servo controller configured to select and employ a controller having a least amount of expected written-in run-out among a set of controllers.

Another embodiment of the present invention is a method comprising a step for applying a set of controllers; and selecting a controller from the set of controllers with a least expected amount of written-in run out.

Another embodiment of the present invention is a system comprising a servo controller means for employing and selecting a disk controller that has a least expected amount of written-in run-out among a set of controllers.

DETAILED DESCRIPTION OF PREFERRED EMBODIMENTS

Embodiments of the present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein, the singular forms "a", "an", and "the" are intended to include the plural forms as well, unless the context clearly indicates otherwise. As used herein the term "and/or" includes any and all combinations of one or more of the associated listed items.

Embodiments of the present invention may be embodied as disk drives, methods, and/or computer program products. Accordingly, embodiments of the present invention may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example a portable computer diskette, a random access memory (RAM), a read-only memory (ROM), an erasable programmable read-only memory (EPROM or Flash memory), an optical fiber, and a portable compact disk read-only memory (CD-ROM).

Embodiments of the present invention are described below with reference to block diagrams, including operational flow charts, of disk drives, methods, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
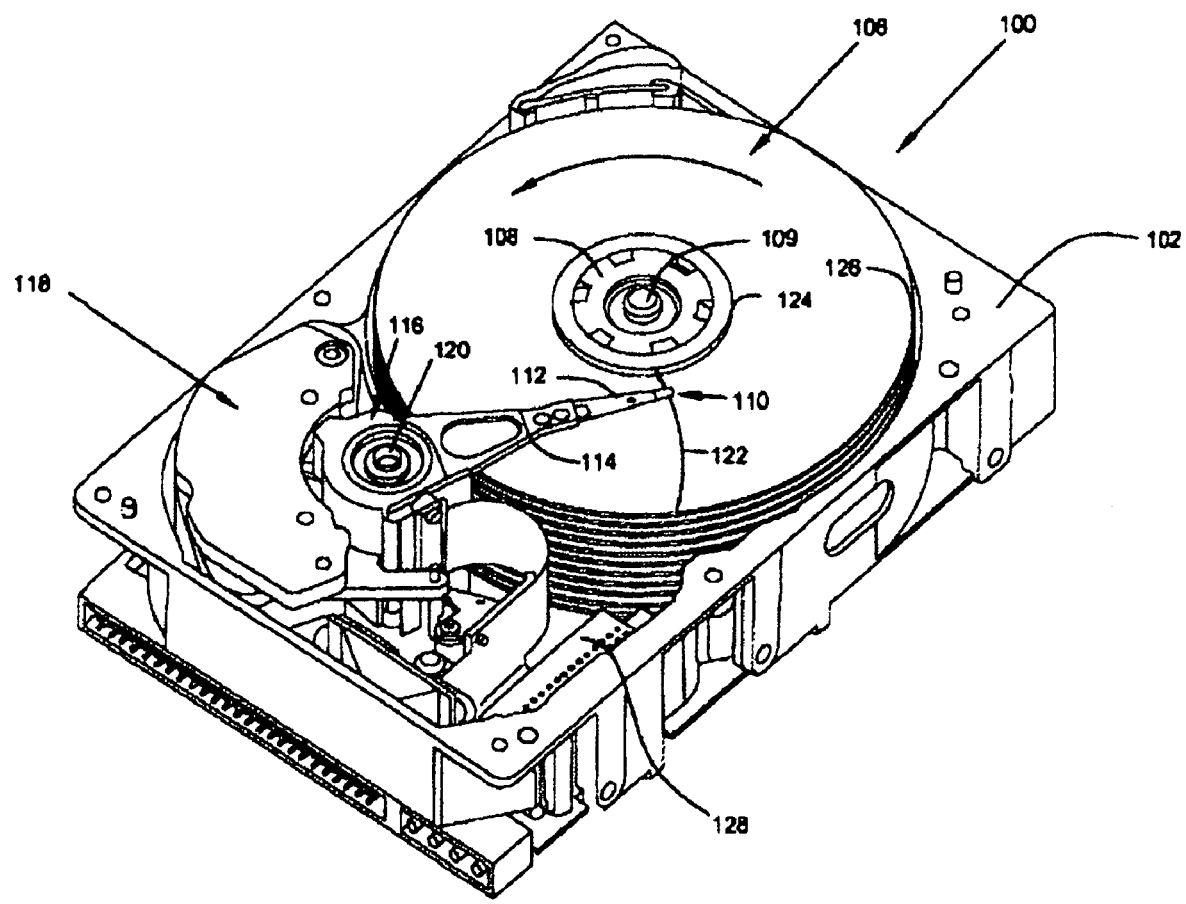
FIG. 1 is a perspective view of a head-disc assembly (HDA)

Referring now to FIG. 1, a perspective view of a head-disc assembly (HDA) 100 with which embodiments of the present invention are useful is shown. The same reference numerals are used in various figures to represent same or similar elements. HDA 100 includes a housing with a base 102 and a top cover (not shown). HDA 100 further includes the disc pack 106, which is mounted on a spindle motor (not shown) by a disc clamp 108. Disc pack 106 includes a plurality of individual discs which are mounted for co-rotation about central axis 109.

Each disc surface has an associated transducer 110 which is mounted in HDA 100 and carries a read/write head for communication with the disc surface. In the example shown in FIG. 1, transducers 110 are supported by suspensions 112 which are, in turn, supported by track accessing arms 114 of an actuator 116. The actuator shown in FIG. 1 is of the type known as a rotary moving coil actuator and includes a voice coil motor (VCM), shown generally as 118. Other types of actuators can be used, such as linear actuators.

VCM 118 rotates actuator 116 with its attached transducers 110 about a pivot shaft 120 to position transducers 110 over a desired data track along a path 122 between a disc inner diameter 124 and a disc outer diameter 126. VCM 118 operates under the control of a closed-loop servo controller within internal circuitry 128 based on position information, which is stored on one or more of the disc surfaces within dedicated servo fields. The servo fields can be interleaved with data sectors on each disc surface or can be located on a single disc surface that is dedicated to storing servo information. As transducer 110 passes over the servo fields, the read/write head generates a readback signal that identifies the location of the head relative to the center line of the desired track. Based on this location, actuator 116 moves suspension 112 to adjust the head's position so that it moves toward the desired position. Once the transducing head is appropriately positioned, servo controller 128 then executes the desired read or write operation.

Figure 2:
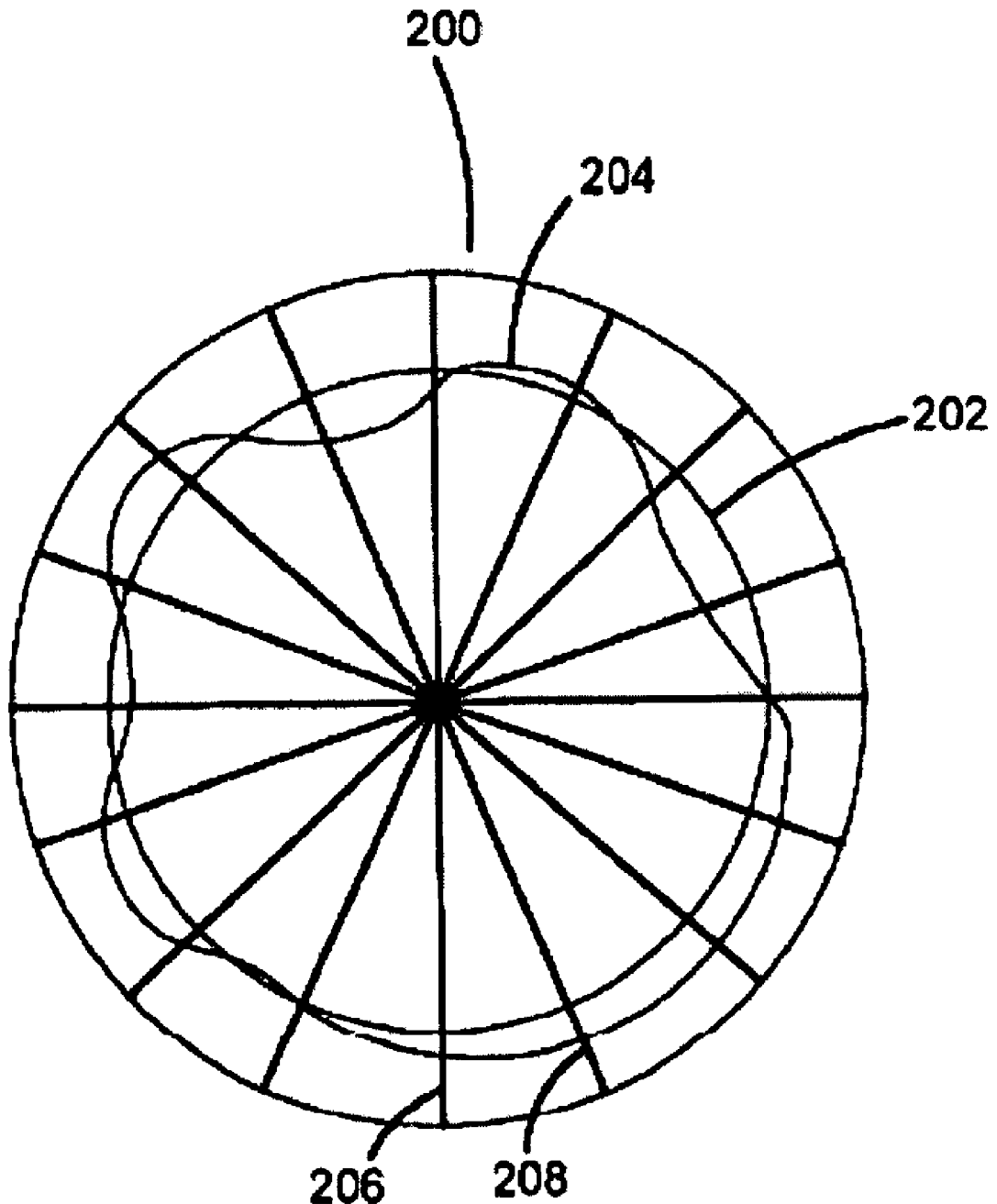
FIG. 2 is a top view of a section of a disk showing an ideal track and a realized written-in track.

Referring now to FIG. 2, a top view of a section 200 of a disc with an ideal, perfectly circular track 202 and an actual track 204 is shown. Section 200 includes a plurality of radially extending servo fields such as servo fields 206 and 208. The servo fields include servo information that identifies the location of actual track 204 along disc section 200. Any variation in the position of a head away from circular track 202 is considered as position error. The portions of track 204 that do not follow circular track 202 create written-in repeatable run-out position errors. A position error is considered a repeatable run-out error if the same error occurs each time the head passes a particular circumferential location on the disc. Track 204 creates a repeatable run-out error because each time a head follows the servo fields that define track 204, it produces the same position error relative to ideal track 202.

Under embodiments of the present invention, a head attempting to write to or read from track 204 will not follow track 204 but instead, will more closely follow perfectly circular track 202. This is accomplished using presented optimization techniques here that minimize tracking of repeatable run-out errors resulting from the irregular shape of track 204.

Figure 3:
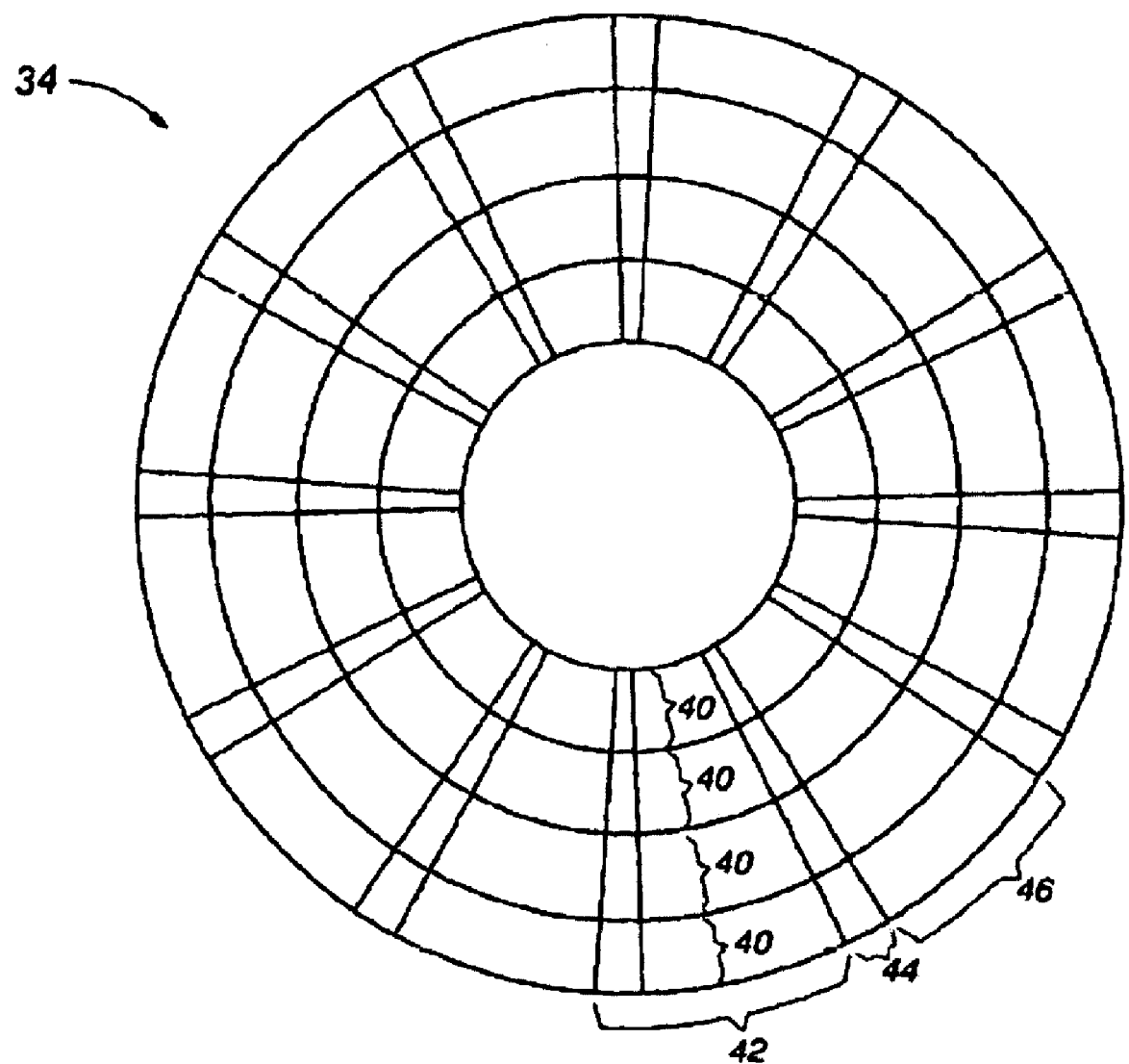
FIG. 3 is a top view of a conventional disk and illustrates tracks and sectors, with each of the sectors being divided into a servo region and a data region.

FIG. 3 further illustrates one of the disks of the disk pack 106 of FIG. 1, labeled here as 34. Data is stored on the disk 34 within a number of concentric radial tracks 40 (or cylinders). Each track is divided into a plurality of sectors 42. Each sector 42 is further divided into a servo region 44 and a data region 46. The servo regions 44 of the disk 34 are used to, among other things, accurately position the transducer 110 so that data can be properly written onto and read from the disk 34. The data regions 46 are where non-servo related data (i.e., user data) is stored and retrieved. Such data, upon proper conditions, may be overwritten.

As the transducer 10 is positioned over a track 40 (i.e., during a track following operation), it reads the servo information contained in the servo regions 44 of the track 40, one servo region 44 at a time. The servo information is used to, among other things, generate a position error signal (PES) as a function of the misalignment between the transducer 10 and a desired position relative to a track centerline. As is well-known in the art, the PES signals are input to a servo control loop which performs calculations and outputs a servo compensation signal which controls the VCM 118 to, ideally, place the transducer 10 at the desired position relative to the track centerline.

Vibration of the disk drive can cause the transducer 110 to have an across track vibration, which can effect the ability of the servo control loop to maintain the transducer 110 on a track during a track following operation. The servo control loop can be configured to compensate for a worst-case amount of vibration, within design constraints, that the transducer 110 may experience while in a track following operation on various tracks across the disk 34. However, optimizing the servo control loop for worst-case vibration conditions may provide less optimal performance (e.g., less data throughput than otherwise possible) in non-vibration conditions.

Figure 4:
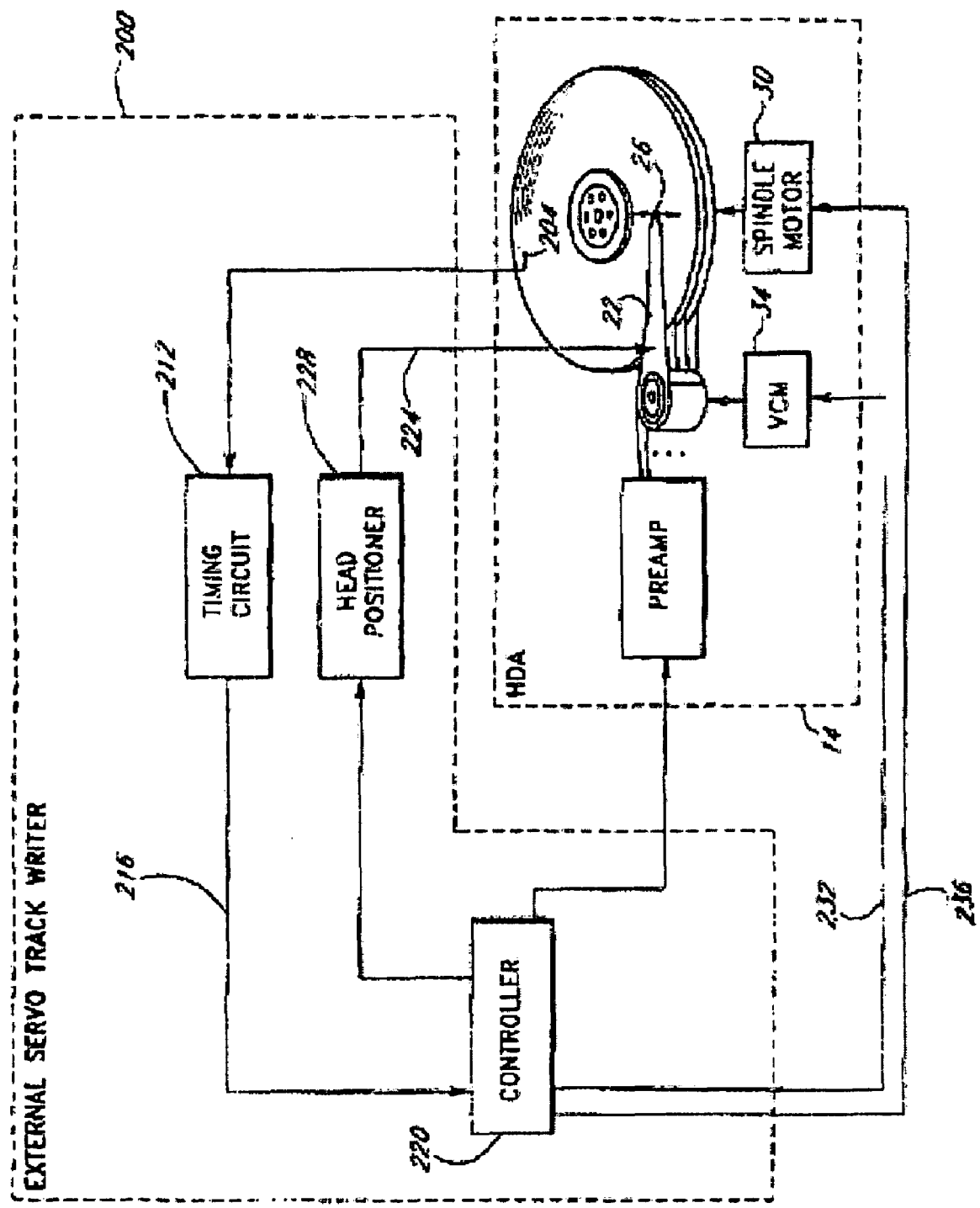
FIG. 4 illustrates the head disk assembly of the disk drive of FIG. 1 inserted during manufacturing into an external servo track writer.

In FIG. 4, a servo track writer (STW) with which embodiments of the present invention are useful is shown. STW is used to write servo regions, including their corresponding fields, onto the surface(s) of the disks during the manufacturing process. An alternate method for writing the servo sectors to the recording surfaces of the disks during manufacturing is "self-servo-writing." Self-servo-writing is a post assembly process. Traditional pre-assembly techniques are costly and time consuming as they would normally require: i) to be done in a clean room environment, and ii) the use of laser interferometry to precisely position the transducer heads as the servo data is written. For example, in order to precisely write the servo regions at desired locations on the disks, the STW directs each transducer 110 to write in small steps.

Figure 5:
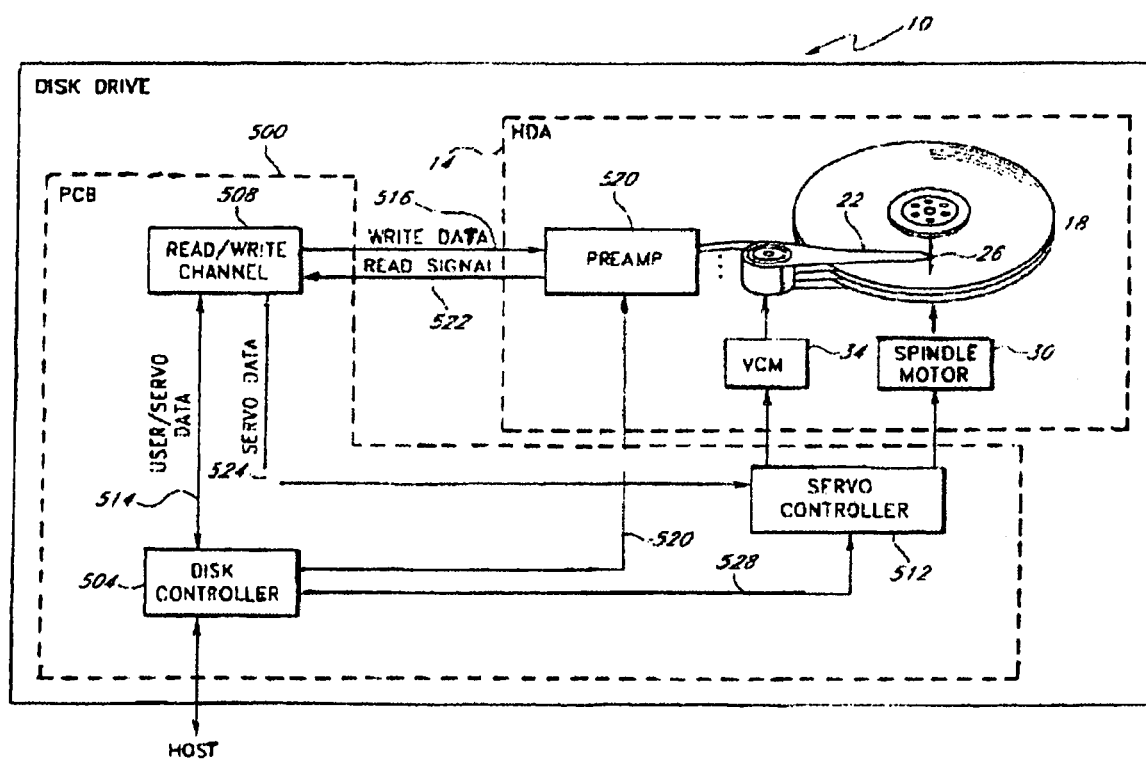
FIG. 5 shows a disk drive employing a self-servo writing operation internal to the disk drive to write the servo sectors to all of the recording surfaces during manufacturing to control the amount of run-out written into the servo tracks.

FIG. 5 shows one organization that is capable of self-servo-writing the servo tracks. Self-servo-writing uses components on a printed circuit board of the disk drive shown in FIG. 1. The printed circuit board can comprise a disk controller 504, a read/write channel 508, and a servo controller 512. FIG. 5 shows one manner of inter-connecting these components wherein a data line 514 propagates signals between the disk controller 504 and the read/write channel 508. Another data line 516 propagates signals from the read/write channel 508 to a preamplifier 520 on the HDA 14. A data line 522 propagates signals from the preamplifier 520 to the read/write channel 508. A data line 524 propagates servo data from the read/write channel 508 to the servo controller 512. A data line 528 propagates signals from the disk controller 504 to the servo controller 512. As is known, these components can be interconnected in different ways in the disk drive.

The self-servo-writing technique can entail an iterative process wherein each servo track as described in FIG. 3, is written using information from a previously written servo track. The read/write channel 508 provides servo data to the servo controller 512 over the line 524. This servo data provides the radial position of the heads 26 with respect to the disks 18, as is known. The servo controller 512 also controls the VCM 34, as is known. One goal is to reduce the written-in run-out error as described above and demonstrated in FIG. 2.

Embodiments of the present invention reduce the written-in run-out in servo data written to a storage medium. A set of servo controllers are evaluated and the controller having the best expected performance among the set is selected and employed. The methods and systems disclosed could be used in any servo writing scheme, including a drive assist servo track writer or ex-situ servo track writer in addition to the self-servo write example.

One embodiment of the present invention is a servo controller configured to select and employ a controller having a least amount of expected written-in run-out among a set of controllers. An embodiment of such an organization shown in FIG. 6, which comprises of: 1) a component comprising a plurality of controllers which either have been pre-determined or get calculated in real-time, 2) a cost function evaluator that receives as input the controllers (from the component comprising the plurality of controllers) one at time and based on a cost function evaluates an expected amount of written-in run-out for each of the controllers, and then selects and outputs one controller having the least expected amount of written-in run-out, 3) a self-servo track writer based on FIG. 5 that employs the selected controller, and 4) a regular servo track writer based on FIG. 4 that uses the selected controller in case there is no self-servo mode available.

Figure 6:
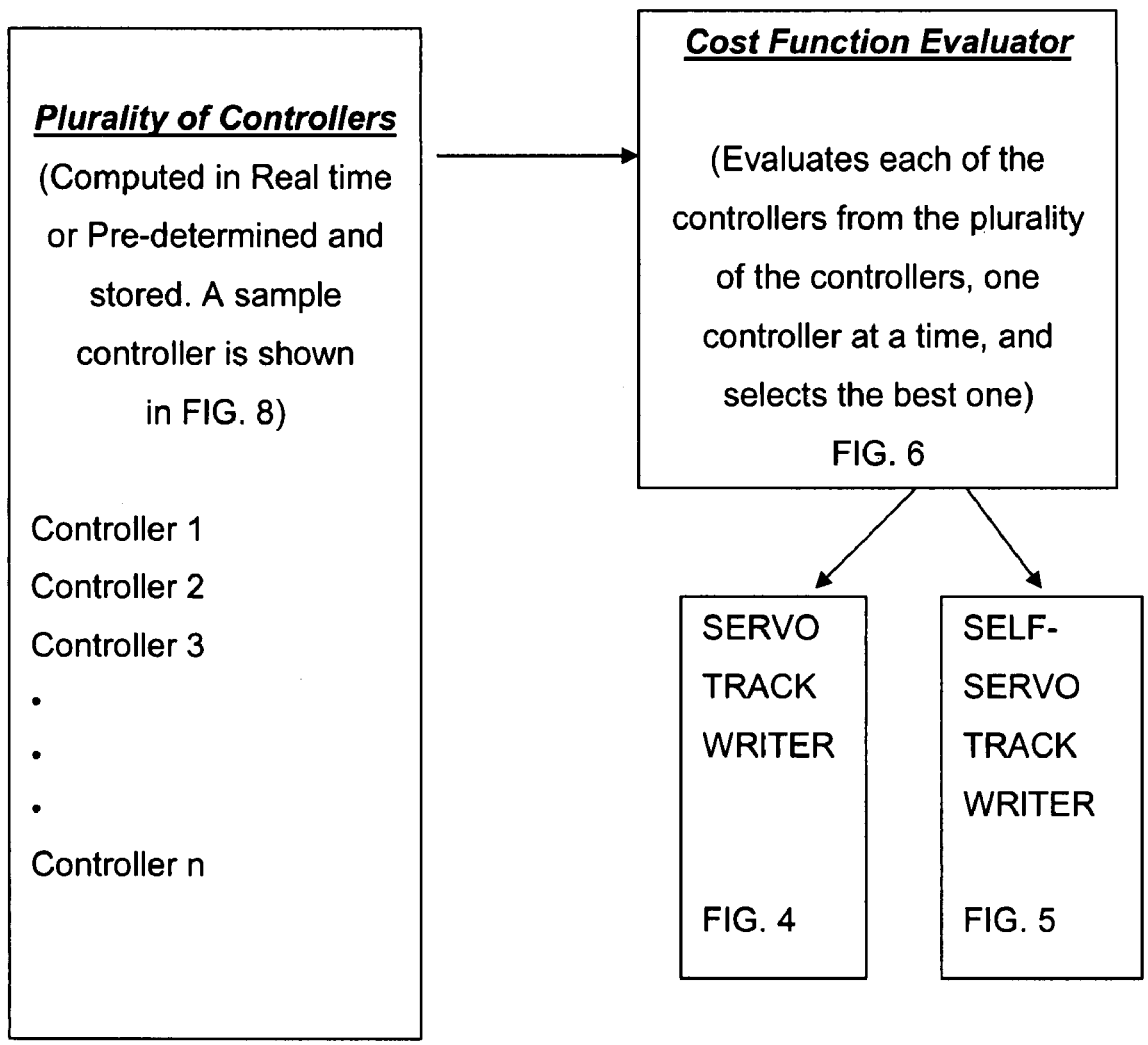
FIG. 6 is a block diagram describing a system embodiment of the present invention.
Figure 8:
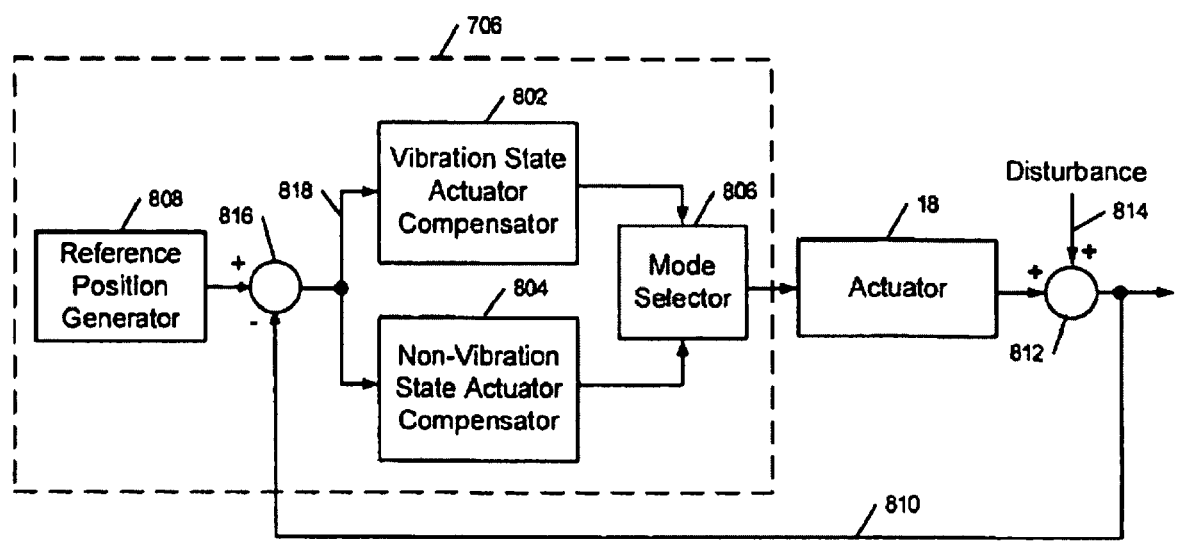
FIG. 8 is a block diagram of one sample controller from the "plurality of controllers block" of FIG. 6.

The first component of FIG. 6 as described above, comprises a plurality of controllers. These controllers have been either pre-calculated or are calculated in real-time. An exemplary embodiment of a controller 706 is shown in FIG. 8. The controller 706 is configured to determine a vibration state of the transducer relative to the disk. The determined vibration state of the transducer indicates whether the transducer is subjected to vibration, and/or may indicate whether the transducer is subjected to at least a threshold amount of vibration. The controller 706 is also configured to control positioning of the transducer to maintain the transducer on a track on the disk (i.e., during track following). The positioning is controlled based on a compensation scheme that varies based on the determined vibration state of the transducer. The controller 706 can include a plurality of actuator compensators. In the example shown, it includes two actuator compensators, a vibration state actuator compensator 802 and a non-vibration state actuator compensator 804, a mode selector 806, and a reference position generator 808.

During a track following operation, the controller 706 senses, via the transducer, the servo patterns along the track to generate a sensed position signal 810, which indicates a position of the transducer relative to the track. The position of the transducer is affected by the combined effects, illustrated by summing node 812, of positioning of the actuator 18 and disturbances 814 on the transducer. The disturbances 814 can include a component due to vibration from external shock on the disk drive.

The sensed position signal 810 is fed-back to a summing node 816, where it is combined with a desired reference position signal from the reference position generator 808 to generate a position error signal 818. The desired reference position signal may be a DC value (e.g., static value), such as zero, for at least a portion of the revolution of the disks. The reference position generator 808 can be configured to drive the transducer toward the centerline of a data track during track following.

The compensators 802, 804 are configured to control positioning of the transducer, based on the position error signal 818, to attempt to maintain the transducer on a track during track following. However, the compensators 802, 804 have different disturbance transfer functions (i.e., ratio of their output response to their input) relative to each other when the transducer is subjected to vibration. The vibration state actuator compensator 802 can be configured to provide better positioning of the transducer during track following (i.e., less data track misregistration TMR and reduced likelihood of read/write data errors) while the transducer is subjected to vibration, relative to the non-vibration state actuator compensator 804. In contrast, the non-vibration state actuator compensator 804 can be configured to provide better positioning of the transducer during track following while the transducer is not subjected to vibration (e.g., transducer experiences less than a threshold amount of vibration), and, thereby, better throughput for data read from and/or written to the disk through the transducer.

The compensators 802, 804 can be electronic devices that are separately packaged from each other. For example, the compensators 802, 804 can each include a separate digital signal processor, general purpose processor, and/or ASIC.

The mode selector 806 is configured to determine a vibration state of the transducer relative to the disk, and to select between the output of the vibration state actuator compensator 802 or the output of the non-vibration state actuator compensator 804 based on that determination. The mode selector 806 passes the selected output of one of the compensators 802 and 804 as a control signal to the actuator 18, where it is used to position the transducer relative to a track.

When the transducer is subject to less than a threshold amount of vibration, the mode selector 806 selects the output of the non-vibration state actuator compensator 804 to pass through as the control signal to the actuator 18. In contrast, when the transducer is subject to at least a threshold amount of vibration, the mode selector 806 selects the output of vibration state actuator compensator 802 to pass through as the control signal to the actuator 18. Accordingly, the controller 706 varies its compensation scheme between that provided by the two compensators 802, 804 based on a vibration state (e.g., an amount of vibration) of the transducer. The compensators 802, 804 can be configured to provide a response that is optimized to either vibration (i.e., by compensator 802) or non-vibration (i.e., by compensator 804). Thus, for example, positioning of the transducer can be controlled to provide higher read/write data throughput in a non-vibration environment and higher read/write data reliability in a vibration environment.

The vibration state actuator compensator 802 and the non-vibration state actuator compensator 804 can operate in parallel responding to the position error signal 818, so that they each generate an output that is available to the mode selector 806 for use in controlling positioning of the transducer by the actuator 18. To avoid a discontinuous change in the control signal provided to the actuator 18, the mode selector 806 may delay switching between the output of the compensators 802 and 804 until the transducer is being moved between tracks in a seek operation. A discontinuous change in the control signal may be avoided by configuring the compensators 802, 804 to have the same number of control system response orders and similar delay (i.e., between input to output) responsive to the position error signal 818.

The mode selector 806 switches between the outputs of the compensators 802 and 804 based on the determined vibration state of the transducer, such as whether the transducer is subjected to at least a threshold amount of vibration. The mode selector 806 may determine the vibration state of the transducer by monitoring the position error signal 818, which may be provided to the mode selector 806 through the compensators 802, 804 or directly thereto. For example, the mode selector 806 may determine whether the position error signal 818 exceeds a threshold value a threshold number of times within a number of sectors and/or within an elapsed time (e.g. monitor bumps in the position error signal 818). The mode selector 806 may determine the vibration state of the transducer by monitoring the power spectrum of the position error signal 818, which may indicate presence or absence of a threshold amount of vibration of the transducer. The mode selector 806 may determine the power spectrum of the position error signal 818 by, for example, performing a fast-Fourier transform thereon, such as via a floating point gate array (FPGA).

The vibration state of the transducer may also be determined by monitoring throughput of data read from and/or written to the disk 34. While the non-vibration state actuator compensator 804 is controlling positioning of the transducer, a threshold amount of decrease in data throughput can indicate that the controller 804 is not able to sufficiently compensate for vibration of the transducer, and that a switch to the vibration state actuator compensator 802 is desired. In contrast, while the vibration state actuator compensator 802 is controlling positioning of the transducer, a threshold amount of rise in data throughput can indicate that the transducer is subject to a sufficiently low vibration such that a switch to the non-vibration state actuator compensator 804 is desired.

The mode selector 806 may transition between the output of the compensators 802, 804 to provide a more continuous control signal to the actuator 18. For example, the mode selector 806 may increase a contribution of the output from one of the compensators 802, 804 while decreasing the contribution of the output from the other one of the compensators 802, 804 to the control signal provided to the actuator 18.

Figure 7:
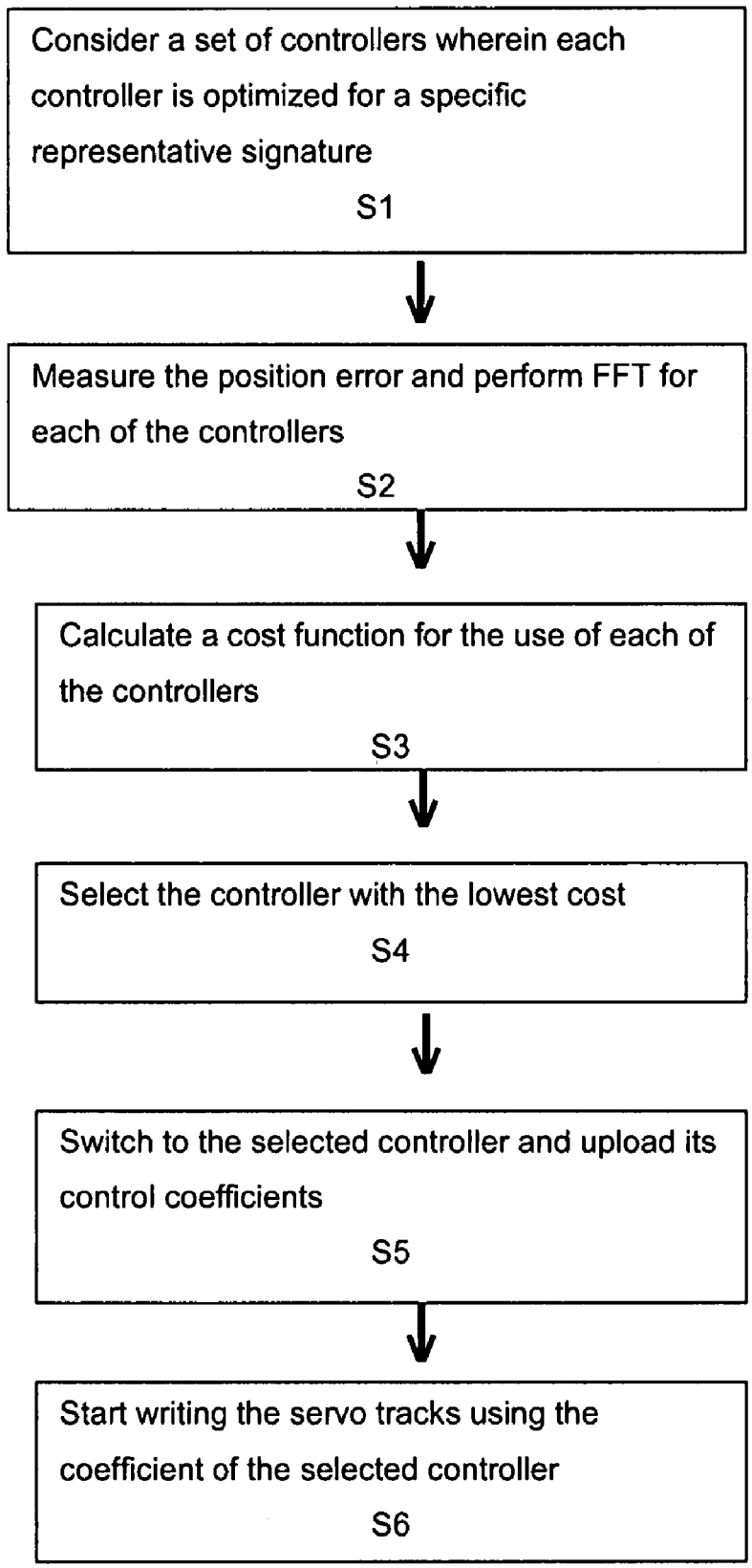
FIG. 7 is a flow chart describing a process embodiment of the present invention.

Another embodiment of the present invention is a method comprising a step for applying a set of controllers; and selecting a controller from the set of controllers with a least expected amount of written-in run out. The mechanism for controlling the self-servo writing described in FIG. 7, comprises the following steps: S1) Considering a set of controllers wherein each controller is optimized for a specific representative signature; S2) Measuring the position error and performing FFT for each of the controllers; S3) Calculating a cost function for the use of each of the controllers; S4) Selecting the controller with the lowest cost, S5) Switching to the selected controller and uploading its control coefficients, S6) Start writing the servo tracks using the coefficient of the selected controller.

In one embodiment, in the frequency domain, the selected controller is one having the least expected amount of written-in run-out error wherein the minimization is performed using the following cost function:

$$\min \sum_{k=1}^{n} (g_t(f(k)*2*\pi) * g_c(f(k)*2*\pi) * d(f(k)*2*\pi))^2$$

$g_g$—: error transfer function gain of servowrite controller,
$g_c$—: error transfer function gain of customer—code controller;
d: disturbance as in position;
Since the position error (e) is equal to d*g, this leads to:

$$\min \sum_{k=1}^{n} (g_t(f(k)*2*\pi) * e(f(k)*2*\pi))^2$$

e: position error;

Another embodiment of the present invention is a system comprising a servo controller means for employing and selecting a disk controller that has a least expected amount of written-in run-out among a set of controllers.

In another embodiment of the present invention, where there is a disk drive with multiple disks as described previously, the servo controller selected is the one which produces the best result with respect to only one of the disks. Therefore, the selection is performed for one disk at a time.

In another embodiment, the controller is selected in such a way that it produces the best results considering all the disk drives in the stack of the disks in the drive. Therefore, the selected controller will be used for all the disks in the disk drive.

Prior to this invention, one fixed controller was used by the Servo Track Writer for all disk drives in the same product family. The fixed controller was one which worked relatively well considering all types of disturbances. However, since there are variances between different disk drives belonging to the same family of products, the embodiments of the present invention try to match the best available controller to each disk or disk drive, where each available controller is optimized for a specific type of disturbance signature. Such a mechanism leads to having better quality self-servo-write controllers with lower written-in run-out errors.

Figure 9:
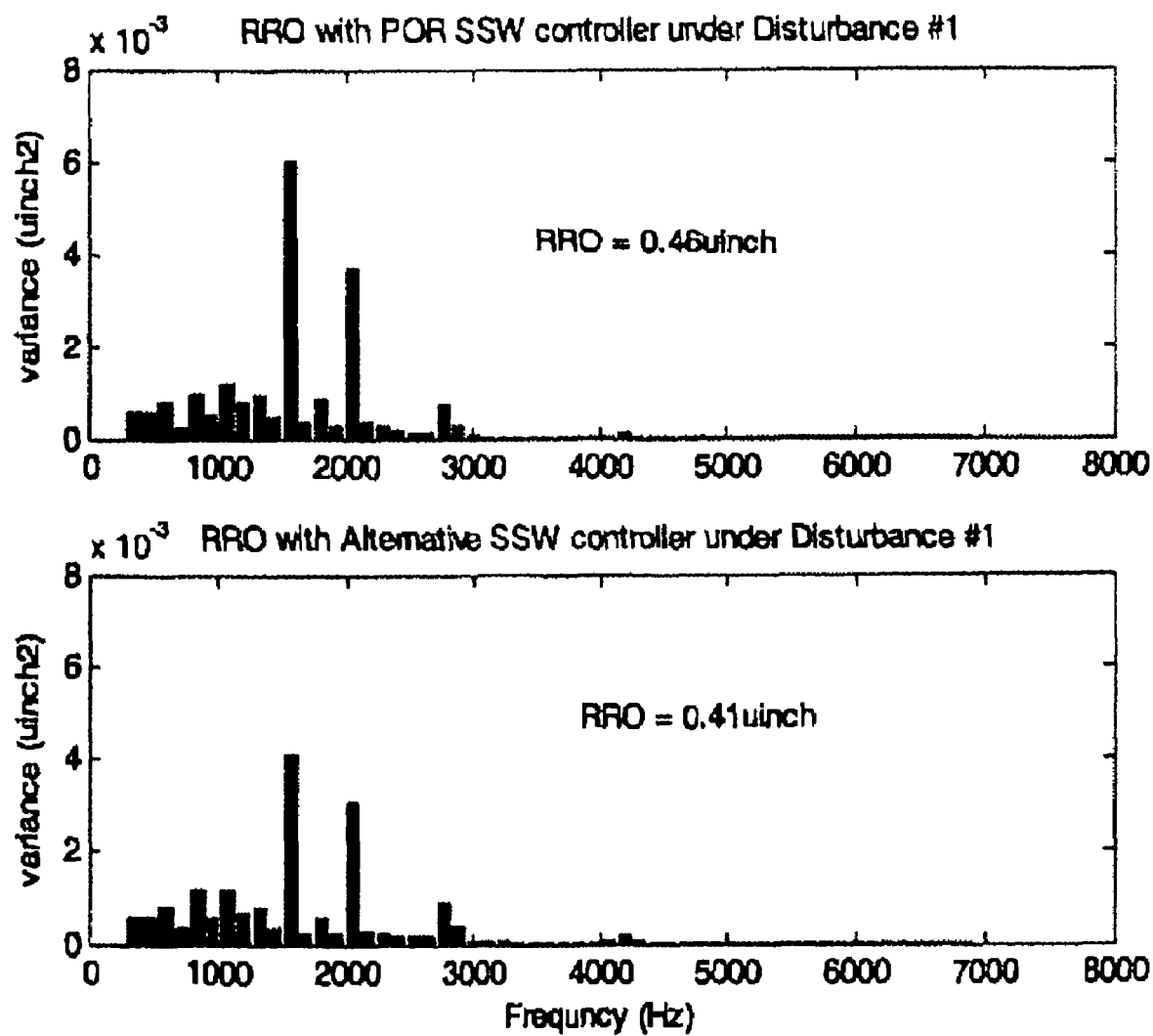
FIG. 9 are two charts showing the written-in run-out error using a fixed controller versus using an alternate controller.
Figure 10:
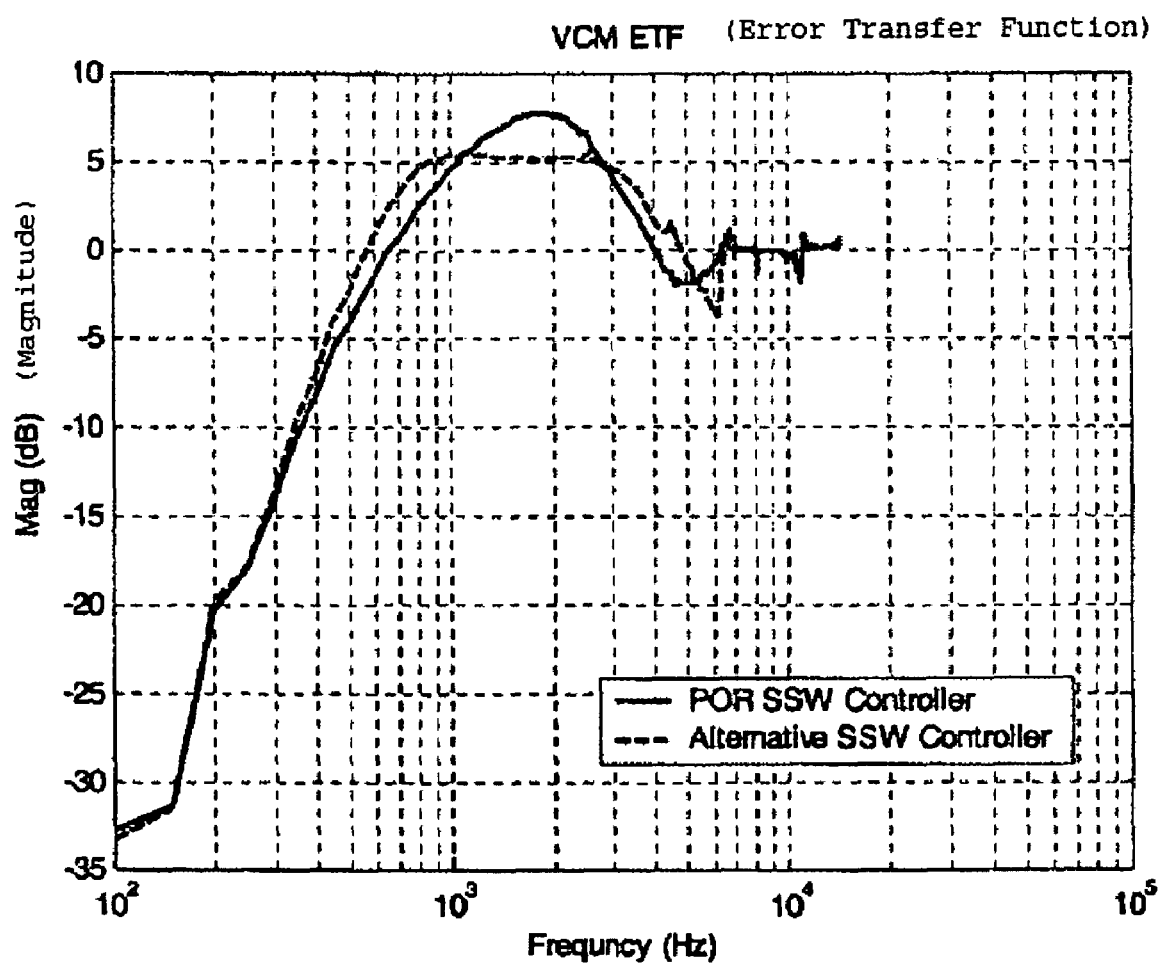
FIG. 10 is a chart showing an effect of applying the alternate controller of FIG. 9.

The following charts illustrate the type of improvements that are obtained with the embodiments of the present invention. FIG. 9 shows a side by side comparison of what happens when an alternate controller is used as opposed to using the fixed controller. As it is shown in FIG. 10, the written-in run-out (RRO) is reduced by 8%. In the graph of FIG. 10, frequency of the disturbance is shown along the x-asis, and the magnitude of the ratio of the output to the input of the respective controllers is shown along the y-axis.

The explanation given above relates to samples of a few possible embodiments of the present invention. The present invention is not in any way limited to the embodiments that were discussed above. Various modifications and changes are possible without diverging from the scope of the present invention.

What is claimed is:

1. A system comprising:
   a servo controller configured to select and employ a controller from a plurality of controllers, where the selected controller produces a least amount of written-in run-out error among the plurality of controllers; and
   a mode selector that is configured to receive outputs of the plurality of controllers and to generate an actuator control signal in response to a contribution of the outputs of at least two of the plurality of controllers that are operating in parallel, wherein the mode selector is configured to provide a continuous transition between outputs of the at least two of the controllers.

2. The system of claim 1, wherein the controller selected is used for writing servo information in a disk drive.

3. The system of claim 2,
   wherein the system is operable for use with the disk drive, the disk drive having a disk, and
   wherein the least amount of written-in-run-out error appears in servo tracks of the disk.

4. The system of claim 1, wherein each of the controllers is optimized based on a respective disturbance signature associated with each respective controller.

5. The system of claim 1, wherein the respective amount of written-in run-out error of each of the controllers is computed by applying a cost function.

6. The system of claim 1, further comprising one or more disks wherein the selected controller is employed with one of the one or more disks.

7. The system of claim 1, further comprising one or more disks wherein the selected controller is employed with all of the one or more disks.

8. The system of claim 1, wherein the servo controller is a self-servo writing controller.

9. The system of claim 1,
   wherein the servo controller is configured to determine the written-in run-out error produced by each of the controllers, and
   wherein the selected controller corresponds to the controller determined to produce the least written-in run-out error among the controllers.

10. The system of claim 1,
    wherein the system is operable for use with a disk drive, and
    wherein each of the controllers is configured to process a position error signal (PES) and selectively output a control signal, based on the PES, to an actuator of the disk drive.

11. The system of claim 10, wherein the servo controller is configured to provide to the actuator the control signal of the selected controller, free of the respective control signals of the one or more other controllers of the controllers.

12. The system of claim 1, wherein the least amount of written-in run-out error is produced by the selected controller in servo data written by the selected controller.

13. The system of claim 1, wherein the mode selector is further configured to increase a contribution in the actuator control signal of the output of the selected controller and to decrease a contribution in the actuator control signal of a non-selected controller in response to a position error signal to thereby provide a continuous transition in the actuator control signal.

14. The system of claim 1, wherein the mode selector is configured to delay a transition between outputs of a non-selected controller and the selected controller until a transducer operatively controlled by the servo controller is moved between tracks in a seek operation.

15. A method comprising:
providing a plurality of controllers operating in parallel; and
selecting a controller from the controllers producing a least expected amount of written-in run out error among the controllers; and
smoothly transitioning between an output of a first one of the controllers to the selected one of the controllers to provide a continuous control signal in response to contributions of the outputs of at least two of the plurality of controllers operating in parallel.

16. A method according to claim 15, further comprising:
determining a position error produced by each of the controllers in writing servo data, wherein the selected controller produces the lowest determined position error among the controllers.

17. The method of claim 16, wherein determining the position error produced by each of the controllers comprises performing a fast Fourier transform.

18. A method according to claim 15 further comprising:
calculating a cost function for each of the controllers, wherein the selected controller has the lowest calculated cost of the controllers.

19. The method of claim 15, wherein the selected controller is employed to write servo data.

20. The method of claim 15, wherein each of the controllers is optimized for a respective disturbance signature.

21. The method of claim 15, wherein said selecting is performed with respect to each disk in a disk drive.

22. The method of claim 15, wherein said selecting is performed with respect to all disks in a disk drive.

23. The method of claim 15, wherein the method is performed during a self-servo write process.

24. A system operable for use with a plurality of disk controllers, the system comprising:
determining means for determining an amount of written-in run-out error produced by each of the disk controllers wherein the disk controllers are operating in parallel;
servo controller means for employing and selecting a disk controller corresponding to the disk controller determined to produce the least amount of written-in run-out error among the controllers; and
mode selection means for receiving outputs of the plurality of disk controllers and for generating an actuator control signal in response to a contribution of the outputs of at last two of the plurality of controllers that are operating in parallel, wherein the mode selection means is configured to provide a continuous transition between outputs of the at least two of the controllers.

25. The system of claim 24, wherein the determined amount of written-in run-out is computed using a cost function.

26. The system of claim 24, wherein the servo controller means is a self-servo writing controller.

* * * * *